Patented Apr. 10, 1951

2,548,376

UNITED STATES PATENT OFFICE 2,548,376

COLORATION OF POLYVINYL PLASTICS

Harry Jones, Rochdale, and Clifford Musgrave, Manchester, England, assignors to The Geigy Company Limited, Manchester, England, a British company No Drawing. Application August 12, 1947, Serial No. 768,262. In Great Britain August 14, 1946

13 Claims. (Cl. 260—41)

This invention relates to improvements in the colouration of polyvinyl plastics.

For use in the plastics industry, polymerised vinyl compounds are generally mixed with plasticisers and in colouring the plasticised polyvinyl mass it has been customary to use pigments of an inorganic or organic type, or dyestuffs which are actually soluble in the polymer or in the plasticiser or in both, e. g. acetate silk colours and oil soluble dyes. Such colouring matters are not always satisfactory. Many inorganic colours are heat sensitive; many are sensitive to the action of hydrochloric acid which is a decomposition product of chlorinated polymers, such as polyvinyl chloride, and is easily liberated at high temperatures. Many organic pigments suffer from similar defects and in addition, in common with the acetate silk colours and oil soluble dyes, exhibit a defect known as "migration," which is the transference of colour from the plastic to any other material with which it may be in contact; they may also show the defect called "surface chalking," namely the eventual appearance of the colouring matter as a dry crystalline or powder layer on the surface of the plastic. Organic "pigments" are so described on account of their insolubility in water, but they have surprisingly high solubilities in plastisised polymer masses and in consequence of the latter partially dissolve during the high temperature processing of the plastic mass. Subsequent cooling frequently causes the pigment to come out of solution in the plastic which is the most logical explanation of the phenomenon of "surface chalking." Even those organic pigments which are still soluble or partially soluble in such heat treated plastics after cooling may become able to diffuse through the plastic mass to adjoining or contiguous surfaces, especially uncoloured or coloured plastic masses or films. This phenomenon is apparently one of the distribution of the solute between two contiguous phases and may be described as a "partition-coefficient" effect.

We have now found that certain colouring matters can be applied to the colouring of polyvinyl plastics which, as described below, give results which are surprisingly fast and free from the defects described above.

According to the present invention, polyvinyl plastics coloured throughout are produced by treating the polymer, prior to any heat treatment in presence of a plasticiser causing gelatinisation, with an aqueous solution of a water-soluble dyestuff which is substantially insoluble in organic solvents. The dyestuff solution may be pre-formed or may be produced in situ by separate addition of solid dye and water to the polymer before or after addition of other ingredients of the mix. The polymer alone may be treated with the dyestuff solution and then mixed with a plasticiser and heat treated to bring about gelatinisation. Alternatively the dyestuff solution may be mixed with the polymer in presence of a plasticizer provided that such mixing is done before the step of heat treatment which brings about gelatinisation of the polymer and plasticiser. The preferred method is, however, to treat the finely-divided polymer with a pre-formed solution of dyestuff before the addition of the plasticiser, there being no need to remove the water prior to the latter step; this method yields, for a given proportion of dyestuff, a higher colour value and greater freedom from specks of undispersed dyestuff than does that involving the production of the dyestuff solution in situ. It is not necessary to take any special steps to ensure absorption of the dye by the polymer and the colouring may be carried out at room temperature or any convenient higher temperature.

It was not to be expected that water soluble dyestuffs which are substantially insoluble in organic solvents would colour polyvinyl plastics since they are insoluble therein, and do not yield highly coloured surfaces as do pigments. It would be expected moreover, that since they are water-soluble, they would show a marked sensitivity to the action of water, aqueous detergents and the like. However, it has been found that the coloured polyvinyl plastics obtained by the process of the present invention are substantially fast to the action of water, aqueous detergents and the like. This is a surprising result and is altogether unexpected. Since the colouring matters employed in the invention are insoluble in the polyvinyl plastic, they cannot separate from solution nor can they diffuse from their initial location to a contiguously placed plastic. The present invention enables one to use colouring agents for polyvinyl plastics which would not be expected to effect any colouration and furthermore such colourings are fast to the action of water and aqueous detergents and at the same time, show no solubility defects such as lead to the phenomena of "migration" and "surface chalking."

Acid colours of the class of the sulphonated triphenyl methane class, which are both water soluble and spirit (alcohol) soluble, are capable of colouring polyvinyl plastics when employed in aqueous solution but show the characteristic effects of plastic soluble colours e. g. migration and poor fastness to water.

Among the water-soluble dyestuffs substantially insoluble in organic solvents which may be used in the present invention are the direct dyestuffs (i. e. dyestuffs substantive to cotton) and the acid dyestuffs. Among the acid dyestuffs are:

a. Acid wool dyestuffs.
b. Chromable acid dyestuffs used without the addition of chromium compounds.
c. Metalliferous dyestuffs (i. e. dyestuffs actually containing heavy metals such as chromium.
d. Water-soluble "Fanal" dyestuffs (i. e. complex acid compounds of sulphonated triphenylmethane dyestuffs e. g. phosphotungstate or phosphomolybdate compounds).

The blending of the coloured polymer with the plasticiser can be carried out in any of the usual ways involving heat treatment to bring about gelatinisation, e. g. by hot or cold mixing followed by mastication on hot rolls. The water can be removed either before or during the mixing or before or during the gelatinisation. The polymer so coloured can be mixed with polymer which is uncoloured or has been differentially coloured either before, during, or after blending with the plastciser and in any of these cases it is found that the resulting coloured masses show an even distribution of the colour. The colouration produced in this way has been found to have excellent stability to heat and to wet and dry rubbing and does not show "migration." The polyvinyl compounds treated may be polyvinyl chloride, polyvinylidine chloride, polyvinyl esters of organic acid or the so-called conjoint polymers, for example of vinyl chloride and vinyl esters of organic acids.

These are available commercially in a finely ground state and in this state are suitable for treatment with aqueous solutions of direct or acid dyes according to the present invention. Any of the customary plasticisers for such polyvinyl compounds may be used.

As already stated, the aqueous solution of the water-soluble dye which is insoluble in organic solvents may also be mixed with a composition containing polyvinyl compound and plasticizer, provided that this is done prior to the heat treatment in the presence of the plasticiser. Thus the dye may be mixed with a suspension of finely divided polyvinyl chloride in a plasticiser in which the polyvinyl chloride is insoluble at room temperatures but in which it dissolves completely at elevated temperatures such as temperatures over 100° C. Such suspensions are well known and are often termed "polyvinyl pastes." They are rather viscous liquids which can be spread on surfaces or used for impregnating porous materials. When heated to a suitable high temperature i. e. above 100° C. and preferably in the neighbood of 150° C., the polyvinyl chloride and plasticiser dissolve one in the other and on cooling a stable, solid plastic mass is formed.

Coloured plastic masses or coloured powders made by the present invention whether containing plasticiser or not may be used for any desired purpose, i. e. for the production of calendered, moulded, cast or extruded bodies, including filaments, or for the manufacture of lacquers and coating composition. They may also be mixed with other natural or synthetic resins whether coloured or not. Fillers and other pigments may also be incorporated likewise the customary ancillary materials well known in the art, e. g. stabilisers and lubricants.

The invention is illustrated by the following examples in which all parts are by weight.

*Example 1*

The following ingredients are mixed in the cold:

| | Parts |
|---|---|
| Polyvinyl chloride, finely divided | 100 |
| Tricresyl phosphate (plasticiser) | 60 |
| White lead (stabliser) | 7 |
| Water | 6.4 |
| Tartrazine (acid dyestuff, Colour Index, Society of Dyers and Colourists, No. 640) | 0.32 |

The resulting mixture is masticated on hot rolls at 140–150° C. for 15 minutes, moulded at 160° for 5 minutes, and cooled before removal from the press. The opaque coloured plastic so produced is relatively free from specks of undispersed colour, resistant to wet and dry rubbing, and to "chalking" and "colour migration" and is stable to heat.

*Example 2*

The same ingredients and quantities are used as in Example 1, but the tartrazine is added to the solid ingredients as a pre-formed solution in the water, the product is cold mixed, the tricresyl phosphate added with further cold mixing, and the mastication and moulding conducted as in Example 1. The product whilst generally similar to that of Example 1, possesses greater colour value and is free from specks of undispersed colour.

*Example 3*

The procedure is as in Example 2 but an equal quantity of Croceine Scarlet (Colour Index No. 252) is substituted for the tartrazine. A plastic similar to that of Example 2 except in colour is obtained.

*Example 4*

The procedure is as in Example 2 but 3 parts of lead stearate are substituted for the 7 parts of white lead. A transparent coloured plastic is produced, having similar properties to that of Example 2.

*Example 5*

100 parts of polyvinyl chloride are cold mixed until homogeneous with a solution of 1 part of tartrazine in 20 parts of water and the product is dried below 100° C. The resulting coloured powder can be added to a larger bulk of polymer/plasticiser mix prior to hot rolling, thus providing a means of obtaining a concentrated shade without the necessity of eliminating large amounts of water during the gelatinising process.

*Example 6*

The procedure is as in Example 2 but an equal quantity of a copolymer of vinyl chloride and vinyl acetate containing 5–8% of polyvinyl acetate is substituted for the polyvinyl chloride. A coloured plastic similar to that of Example 2 is obtained.

*Example 7*

100 parts of finely powdered polyvinyl acetate are cold mixed with a solution of 0.32 part of tartrazine in 10 parts of water and the product is milled for 5 minutes at 130° C. and moulded for 5 minutes at 160° C. A transparent rather brittle coloured plastic showing no specks of undispersed dyestuff is obtained.

Example 8

The procedure is as in Example 2 but an equal quantity of a copolymer of vinyl chloride and vinylidine chloride is substituted for the polyvinyl chloride. A coloured plastic similar to that of Example 2 is obtained.

The procedure described in any of Examples 1 to 5 may be modified by substituting for the polyvinyl compound specified an equal quantity of a copolymer of vinyl chloride and vinyl acetate containing 5–8% or 10 to 12% of vinyl acetate.

Other acid dyestuffs which may be substituted for the acid dyestuffs described in the foregoing examples are the following:

| Dyestuff: | Colour Index number |
|---|---|
| Erio Floxine 2G1 | No. 31 |
| Polar Yellow 2G conc. | No. 642 |
| Nigrosine K | No. 865 |
| Acid Orange GG | No. 27 |
| Azo Dark Green A | No. 247 |
| Roccelline | No. 176 |

Example 9

The following ingredients are mixed in the cold:

| | Parts |
|---|---|
| Polyvinyl chloride, finely divided | 100 |
| White lead (stabiliser) | 7 |
| A 5% aqueous solution of Solophenyl Yellow GFL (a direct cotton dyestuff) | 6.4 |

To the mixture 60 parts of tricresyl phosphate are added with a further cold mixing, and the product is masticated on hot rolls at 140–150° C. for 15 minutes, moulded at 160° C. for five minutes, and cooled before removal from the press. The opaque coloured plastic so produced is free from specks of undispersed colour, resistant to wet and dry rubbing and to "chalking" and "colour migration."

Example 10

The procedure is as in Example 9 but an equal quantity of Solophenyl Violet 4BL (direct dyestuff) is substituted for the Solophenyl Yellow GFL. A plastic similar to that of Example 9 except in colour, is obtained.

Example 11

The procedure is as in Example 9 but an equal quantity of Diphenyl Chrysoine 3G (a direct cotton dyestuff of Colour Index No. 365) is substituted for the Solophenyl Yellow GFL, and 3 parts of lead stearate for the 7 parts of white lead. A transparent coloured plastic is produced, having similar properties to that of Example 9.

Example 12

The procedure is as in Example 9 but an equal quantity of Eriochrome Red PE1 (Colour Index No. 216) is substituted for the Solophenyl Yellow GFL. A plastic similar in properties to that obtained by Example 9 is produced. Eriochrome Red PE1 is an acid wool dye but it is also one of the so-called "chrome colours," i. e. an acid dyeing wool colour which is normally after-treated in wool dyeing with sodium bichromate to give a metallic complex. In this example, however, the dyestuff is used as such without the formation of the metallic complex.

Example 13

The procedure is as in Example 9 but an equal quantity of Eriochrome Brown G (a chromable acid dyestuff, Colour Index No. 101) is substituted for the Solophenyl Yellow GFL. A plastic similar in properties to that of Example 9 is obtained.

The following Examples 14 to 17 employ dyestuffs which are water-soluble metallic complexes (mainly chromium) of so-called "chrome dyes," normally employed in the acid dyeing of wool. They differ from the usual type of mordant or chrome colour in that the metalliferous component is already embodied in the dye before the application of the latter in the acid dye bath.

Example 14

The procedure is as in Example 9 but an equal quantity of Iragon Blue G (metalliferous dyestuff) is substituted for the Solophenyl Yellow GFL. A plastic similar to that of Example 9 is obtained.

Example 15

The procedure is as in Example 9 but an equal quantity of Iragon Red G (metalliferous dyestuff) is substituted for the Solophenyl Yellow GFL. A plastic similar in properties to that of Example 9 is obtained.

Example 16

The procedure is as in Example 9 but an equal quantity of Neolan Pink G (metalliferous dyestuff) is substituted for the Solophenyl Yellow GF1. A plastic similar in properties to that of Example 9 is obtained.

Example 17

The procedure is as in Example 9 but an equal quantity of Neolan Blue 2R (metalliferous dyestuff) is substituted for the Solophenyl Yellow GFL. A plastic similar in properties to that of Example 9 is obtained.

Example 18

This example employs a water soluble dyestuff of the so-called "soluble Fanal" group. Such dyes comprise the complex acid compounds of sulphonated triphenylmethane dyes, the complex acid being typified by phosphotungstomolybdic acid. They are water soluble dyes, normally used in the manufacture of lakes by the precipitation of their sodium salts from aqueous solutions, as calcium and other insoluble salts.

The procedure is as in Example 9 but an equal quantity of the phosphotungstomolybdic acid complex of Acid Violet 5 RN (a sulphonated triphenylmethane dye) in the form of its sodium salt, is substituted for the Solophenyl Yellow GFL.

Other water-soluble dyestuffs substantially insoluble in organic solvents which may be substituted for the dyestuffs described in the foregoing examples are:

Eriochrome Yellow G (Colour Index No. 343)
Eriochrome Blue 2GK
Eriochrome Brown G (Colour Index No. 101)
Neolan Yellow 8G
Neolan Pink G
Neolan Blue 2K
Iragon Yellow G
Iragon Red G
Iragon Blue G The Eriochrome dyestuffs are of the acid-mordant or chrome type and the Neolan and Iragon dyestuffs are water-soluble forms of acid dyestuffs which already contain a metallic complex, e. g. chromium.

Acid Violet 6B (Colour Index No. 698)
Erio Green B (Colour Index No. 735)

These are further examples of sulphonated triphenylmethane dyestuffs whose phosphotungstomolybdic acid complexes may be used in the present invention.

The above examples illustrate preferred forms of the invention using various polyvinyl plastics i. e. polyvinyl chloride, polyvinyl acetate, copolymers of vinyl chloride and vinyl acetate, copolymers of vinyl chloride and vinylidene chloride. The degree of polymerisation is not critical to the present invention as the process of the present invention may be applied to polymers having any desired degree of polymerisation. The term "polyvinyl" is used to indicate polymers of any compounds containing the group $CH_2=CH-$ including co-polymers of such compounds with any other unsaturated polymerisable compounds as well as the condensation products with aldehydes of the partially hydrolysed polymers.

For plasticising the polyvinyl compound any of the plasticisers customarily employed in the art may be used such as tricresyl phosphate or high boiling esters of dicarboxylic esters e. g. dibutyl phthalate.

We declare that what we claim is:

1. A coloured composition comprising polyvinyl chloride, tricresyl phosphate as plasticiser and tartrazine.

2. The process of producing coloured polyvinyl plastics which comprises mixing the polymer with a water-soluble dyestuff which is substantially insoluble in organic solvents in presence of sufficient water to dissolve said dyestuff, prior to any heat treatment in presence of a plasticiser causing gelatinisation.

3. The process of producing coloured polyvinyl plastics which comprises mixing an aqueous solution of a water-soluble dyestuff which is substantially insoluble in organic solvents with a powdered polyvinyl compound, mixing therewith a plasticiser, heating the mixture until the polyvinyl compound and plasticiser are gelatinised and removing the water at any stage.

4. The process of producing coloured polyvinyl plastics which comprises mixing an aqueous solution of a water-soluble dyestuff which is substantially insoluble in organic solvents with a polymer which includes polyvinyl chloride, prior to any heat treatment in the presence of a plasticiser causing gelatinisation and thereafter removing the water.

5. The process of producing a coloured, plasticised polyvinyl chloride composition which comprises mixing powdered polyvinyl chloride with an aqueous solution of an acid dye, adding a plasticiser, heating the mixture to gelatinisation and removing water during such heating.

6. The process of producing a coloured, plasticised polyvinyl chloride composition which comprises mixing a powdered polymer containing polymerised vinyl chloride with an acid dye, water and a plasticiser and then masticating the mixture on hot rolls.

7. The process of producing a coloured, plasticised polyvinyl chloride composition which comprises mixing a powdered polymer containing polymerised vinyl chloride with an aqueous solution of a water-soluble dyestuff which is substantially insoluble inorganic solvents and with a plasticiser and then masticating the mixture on hot rolls.

8. A polyvinyl plastic coloured throughout with a water-soluble organic dyestuff which is substantially insoluble in organic solvents.

9. A plasticised polyvinyl composition coloured throughout with a water-soluble organic dyestuff which is substantially insoluble in organic solvents.

10. A plasticised polyvinyl composition coloured throughout with a water-soluble acid dyestuff which is substantially insoluble in organic solvents.

11. A plasticised polyvinyl composition coloured throughout with a water-soluble direct dyestuff which is substantially insoluble in organic solvents.

12. A plasticised polyvinyl composition coloured throughout with a water-soluble chromable acid dyestuff which is substantially insoluble in organic solvents.

13. A plasticised polyvinyl chloride composition coloured throughout with a water-soluble organic dyestuff which is substantially insoluble in organic solvents.

HARRY JONES.
CLIFFORD MUSGRAVE.

REFERENCES CITED

The following references are of record in the file of this patent:

UNITED STATES PATENTS

| Number | Name | Date |
|---|---|---|
| 1,966,856 | Groff | July 17, 1934 |
| 2,022,710 | Esselen | Dec. 3, 1935 |

OTHER REFERENCES

Handbook of Plastics, Simonds et al., New York, July 1943, page 274, Table 45, pages 275, 284 and 285.